(12) United States Patent
Shimizu et al.

(10) Patent No.: US 8,435,159 B2
(45) Date of Patent: May 7, 2013

(54) HYDRAULIC CIRCUIT DEVICE

(75) Inventors: Tetsuya Shimizu, Anjo (JP); Kazuki Kojima, Kariya (JP); Kenichi Tsuchida, Nishio (JP); Naoyuki Fukaya, Okazaki (JP); Kazunori Ishikawa, Toyota (JP)

(73) Assignee: Aisin AW Co., Ltd., Aichi-ken (JP)

( * ) Notice: Subject to any disclaimer, the term of this patent is extended or adjusted under 35 U.S.C. 154(b) by 236 days.

(21) Appl. No.: 13/112,004

(22) Filed: May 20, 2011

(65) Prior Publication Data

US 2011/0308649 A1 Dec. 22, 2011

(30) Foreign Application Priority Data

Jun. 22, 2010 (JP) ................................. 2010-141363

(51) Int. Cl.
*F16H 61/26* (2006.01)

(52) U.S. Cl.
USPC ........................................................ 477/130

(58) Field of Classification Search .................. 477/127, 477/130, 143, 156, 158
See application file for complete search history.

(56) References Cited

U.S. PATENT DOCUMENTS

| | | |
|---|---|---|
| 5,676,026 A | 10/1997 | Tsuboi et al. |
| 7,314,423 B2 * | 1/2008 | Park .............................. 475/116 |
| 2005/0209048 A1 | 9/2005 | Morise et al. |
| 2009/0171545 A1 * | 7/2009 | Shimizu et al. .................. 701/60 |
| 2009/0280953 A1 * | 11/2009 | Nishimine et al. .............. 477/62 |
| 2010/0144488 A1 * | 6/2010 | Shimizu et al. ................ 477/130 |
| 2010/0203989 A1 * | 8/2010 | Shirasaka et al. ............... 474/28 |
| 2011/0220823 A1 * | 9/2011 | Shimizu et al. .......... 251/129.15 |

FOREIGN PATENT DOCUMENTS

| | | |
|---|---|---|
| JP | 60-081557 A | 5/1985 |
| JP | 62-017454 A | 1/1987 |
| JP | 8-093901 A | 4/1996 |
| JP | 2003-106443 A | 4/2003 |
| JP | 2005-265101 A | 9/2005 |

OTHER PUBLICATIONS

International Search Report for corresponding International Patent Application No. PCT/JP2011/061344 mailed Jul. 26, 2011.

* cited by examiner

*Primary Examiner* — Justin Holmes
(74) *Attorney, Agent, or Firm* — Sughrue Mion, PLLC

(57) ABSTRACT

A hydraulic circuit for supplying hydraulic pressure to frictional engagement elements in an automatic transmission including an oil passage connecting an output port through which a drive pressure is output, and a second signal pressure port, of a second clutch application relay valve, and an oil passage connecting an output port through which a modulator pressure is output and the second signal pressure port, are formed in a valve body and arranged such that it is possible to open the oil passage, as well as close the oil passage, with an oil passage closing member. With the hydraulic circuit it is possible to change a formed speed in response to a shift operation when a shift, after being operated from a travel position to a non-travel position, is returned again from the non-travel position, at a time of failure.

4 Claims, 10 Drawing Sheets

FIG.2

|   |        | C-1 | C-2 | C-3 | B-1 | B-2 | F-1 | SL1 | SL2 | SL3 | SL4 | S1  | S2 |
|---|--------|-----|-----|-----|-----|-----|-----|-----|-----|-----|-----|-----|----|
|   | P      |     |     |     |     |     |     |     |     |     |     |     |    |
|   | REV    |     |     | O   |     | O   |     |     |     |     |     |     |    |
|   | N      |     |     |     |     |     |     |     |     |     |     |     | O  |
| D | 1st    | O   |     |     |     | (O) | O   | O   |     | (O) |     | (O) |    |
|   | 2nd    | O   |     |     | O   |     |     | O   |     |     | O   |     |    |
|   | 3rd    | O   |     | O   |     |     |     | O   |     | O   |     |     |    |
|   | 4th    | O   | O   |     |     |     |     | O   | O   |     |     |     |    |
|   | 5th    |     | O   | O   |     |     |     |     | O   | O   |     |     |    |
|   | 6th    |     | O   |     | O   |     |     |     | O   |     | O   |     |    |

(O) TO BE ENGAGED WHEN ENGINE BRAKING

HYDRAULIC CIRCUIT DEVICE

INCORPORATION BY REFERENCE

The disclosure of Japanese Patent Application No. 2010-141363 filed on Jun. 22, 2010, including the specification, drawings and abstract thereof, is incorporated herein by reference in its entirety.

BACKGROUND OF THE INVENTION

1. Field of the Invention

The present invention relates to a hydraulic circuit device which supplies hydraulic pressure to a plurality of frictional engagement elements, in an automatic transmission which, being mounted on a vehicle, can change a speed by switching a combination of an engagement and disengagement of the plurality of frictional engagement elements.

2. Description of the Related Art

Heretofore, as this kind of hydraulic circuit device, one which forms a specific speed when an electrical failure occurs, and all solenoids are deenergized, has been proposed (for example, refer to JP-A-2005-265101). This device, being provided with normally closed type solenoid valves SL1, SL2, and SL4, includes a sequence valve which, when a shift lever is in a drive (D) range, at a normal time, connects the solenoid valve SL1 to a C1 clutch, connects the solenoid valve SL2 to a C2 clutch, and connects the solenoid valve SL4 to a B2 brake, and which, at a failure time when all the solenoid valves are deenergized, connects a D range oil passage of a manual valve, which outputs a line pressure in the D range, to servos of either the C1 or C2 clutch and the B2 brake, whereby it is possible to form either a third speed gear or a fifth speed gear even at the failure time, allowing travel to continue.

SUMMARY OF THE INVENTION

However, with a device of a type which can form one of the third speed gear and fifth speed gear (a plurality of kinds of speeds) at the failure time, for example, a configuration can be considered wherein, in the case in which the fifth speed gear is formed at the failure time, the third speed gear is formed when an operation wherein a shift lever, after being once operated from the D range to an N range, is returned to the D range (hereafter called a D-N-D operation) is carried out. At this time, apart from a demand for a specification of setting the third speed gear using the D-N-D operation, a demand for a specification of setting the fifth speed gear using the D-N-D operation can also be considered. In order to respond to this kind of specification, as it normally involves a valve design change or a valve body design change, a huge amount of effort is required.

A hydraulic circuit device of the invention has a main object of it being possible to change a formed speed in response to a shift operation wherein a shift, after being operated from a travel position to a non-travel position, is returned again from the non-travel position to the travel position, at a failure time, without involving a significant design change.

With the hydraulic circuit device of the invention, a third oil passage connecting a first condition maintaining port, through which is input a signal pressure for maintaining a second switching valve in a first condition, and a first connecting port for inputting a travel pressure and outputting it to the first condition maintaining port, and a fourth oil passage connecting the first condition maintaining port and a second connecting port for inputting a line pressure and outputting it to the first condition maintaining port, are formed in a main body, and either the third oil passage or fourth oil passage is closed by an oil passage closing member. Because of this, by the third oil passage being closed by the oil passage closing member, the travel pressure from a shift valve is blocked off when in a non-travel position in a case in which a shift operation, wherein a shift, after being operated from a travel position to the non-travel position, is returned again from the non-travel position to the travel position, is done when a first switching valve is in a second condition, and the second switching valve is in the first condition, meaning that the second switching valve comes into the second condition, and it is possible to form a second speed, while by the fourth oil passage being closed by the oil passage closing member, the line pressure is input into the first condition maintaining port via the first connecting port and third oil passage even when in the non-travel position in a case in which the shift operation, wherein the shift, after being operated from the travel position to the non-travel position, is returned again from the non-travel position to the travel position, is done when the first switching valve is in the second condition, and the second switching valve is in the first condition, meaning that the second switching valve is maintained in the first condition, and it is possible to form a first speed. That is, simply by selecting the oil passage closing member, it is possible to change a formed speed in response to the heretofore described shift operation. Herein, an arrangement can also be such that the "oil passage closing member" is a plate.

With this kind of hydraulic circuit device of the invention, an arrangement can also be such that the main body has a first member in which the second switching valve is inserted, and the first condition maintaining port, first connecting port, and second connecting port are formed, and a second member in which the third oil passage and fourth oil passage are formed, and the oil passage closing member is interposed between the first member and second member.

Also, with the hydraulic circuit device of the invention, an arrangement can also be such that when an acceleration side speed, among formable speeds, is formed, the second switching valve inputs the pressure output from the second pressure adjustment mechanism as a signal pressure and forms the first condition.

BRIEF DESCRIPTION OF THE DRAWINGS

FIG. 2 is an illustration showing an operation table of a speed change mechanism 30;

DETAILED DESCRIPTION OF THE EMBODIMENTS

Next, a description will be given, using a working example, of an embodiment of the invention.

Figure 1:
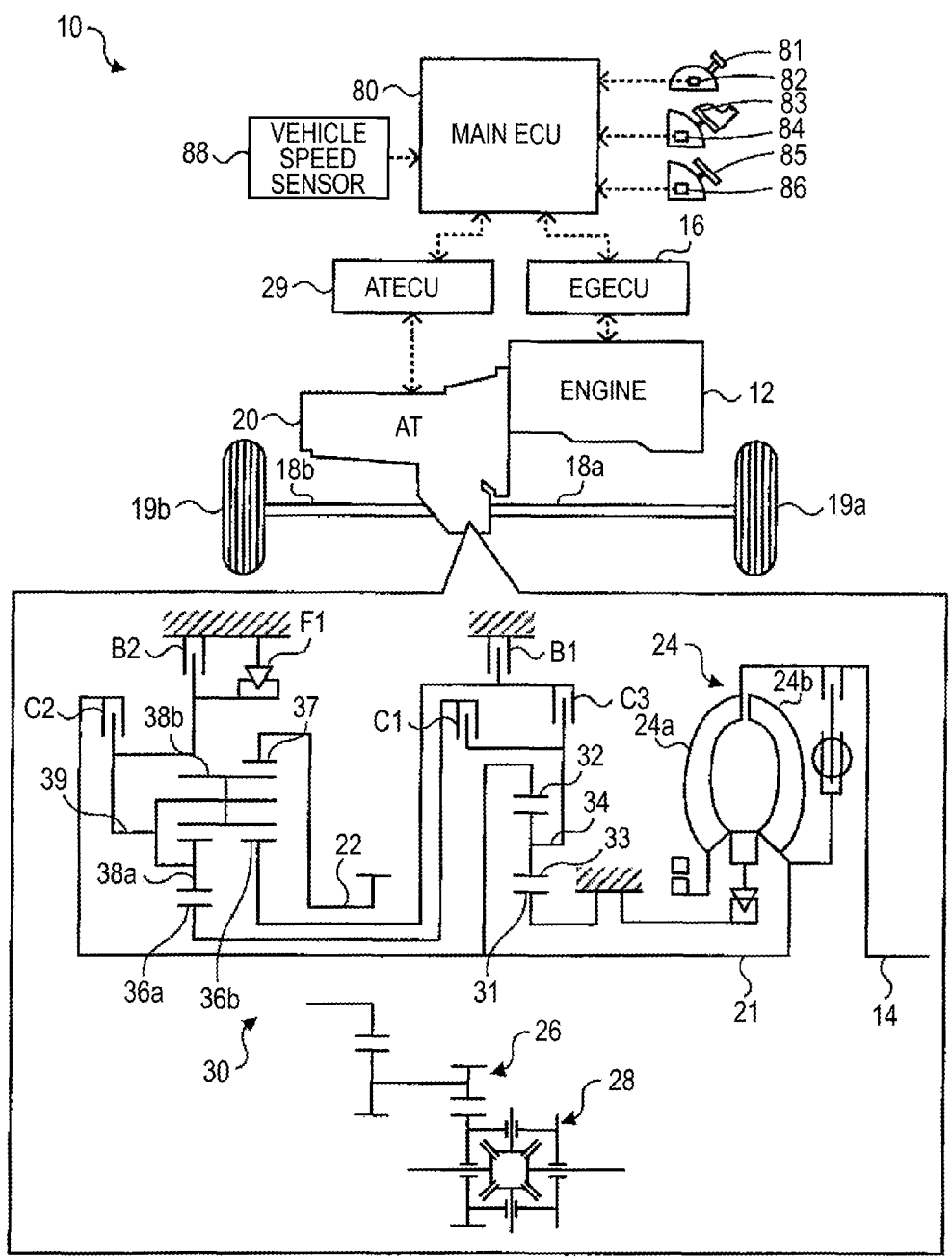
FIG. 1 is a configuration diagram showing an outline of a configuration of an automobile 10.

FIG. 1 is a configuration diagram showing an outline of a configuration of an automobile 10, and FIG. 2 is an illustration showing an operation table of a speed change mechanism 30.

The automobile 10, as shown in FIG. 1, includes an engine 12 as an internal combustion engine which outputs power by explosively burning hydrocarbon system fuel such as gasoline or light oil, an engine electronic control unit (an engine ECU) 16 which inputs an operating condition of the engine 12 from each kind of sensor such as a crank angle sensor which detects a crank angle, and controls the operation of the engine 12, an automatic transmission 20 which, as well as being connected to a crankshaft 14 of the engine 12, is connected to axles 18a and 18b of right and left wheels 19a and 19b, and transmits the power from the engine 12 to the axles 18a and 18b, an automatic transmission electronic control unit (an ATECU) 29 which controls the automatic transmission 20, and a main electronic control unit (a main ECU) 80 which controls the whole of the vehicle. A shift position SP from a shift position sensor 82 which detects an operation position of a shift lever 81, an accelerator pedal angle Acc from an accelerator pedal position sensor 84 which detects an amount by which an accelerator pedal 83 is depressed, a brake switch signal BSW from a brake switch 86 which detects a depression of a brake pedal 85, a vehicle speed V from a vehicle speed sensor 88, and the like, are input into the main EUC 80 via an input port. Also, the main ECU 80, being connected to the engine ECU 16 and ATECU 29 via a communication port, carries out an exchange of various control signals and data with the engine ECU 16 and ATECU 29.

The automatic transmission 20, as shown in FIG. 1, includes a lockup clutch equipped torque converter 24 configured of an input side pump impeller 24a connected to the crankshaft 14 of the engine 12 and an output side turbine runner 24b, the multi-speed change mechanism 30 which, having an input shaft 21 connected to the turbine runner 24b of the torque converter 24 and an output shaft 22 connected to the axles 18a and 18b via a gear train 26 and a differential gear 28, changes the speed of the power input into the input shaft 21, and outputs it to the output shaft 22, and a hydraulic circuit 40 (refer to FIG. 4) as an actuator which drives the speed change mechanism 30. In the working example, an arrangement is such that the torque converter 24 is interposed between the crankshaft 14 of the engine 12 and the speed change mechanism 30 but, not being limited to this, it is possible to employ any kind of staring device.

The speed change mechanism 30, being configured as a six-speed multi-speed change mechanism, includes a single pinion type planetary gear train, a Ravigneaux type planetary gear train, three clutches C1, C2, and C3, two brakes B1 and B2, and a one-way clutch F1. The single pinion type planetary gear train includes a sun gear 31 as an external gear, a ring gear 32 as an internal gear disposed concentrically with the sun gear 31, a plurality of pinion gears 33 which, as well as meshing with the sun gear 31, mesh with the ring gear 32, and a carrier 34 which rotatably and revolvably holds the plurality of pinion gears 33, wherein the sun gear 31 is fixed to a casing, and the ring gear 32 is connected to the input shaft 21. The Ravigneaux type planetary gear train includes two sun gears 36a and 36b as external gears, a ring gear 37 as an internal gear, a plurality of short pinion gears 38a meshing with the sun gear 36a, a plurality of long pinion gears 38b which, as well as meshing with the sun gear 36b and plurality of short pinion gears 38a, mesh with the ring gear 37, and a carrier 39 which links and rotatably and revolvably holds the plurality of short pinion gears 38a and plurality of long pinion gears 38b, wherein the sun gear 36a is connected to the carrier 34 of the single pinion type planetary gear train, the sun gear 36b, as well as being connected to the carrier 34 via the clutch C3, is connected to the casing via the brake B1, the ring gear 37 is connected to the output shaft 22, and the carrier 39 is connected to the input shaft 21 via the clutch C2. Also, the carrier 39, as well as being connected to the casing via the one-way clutch F1, is connected to the casing via the brake B2 provided in parallel with the one-way clutch F1.

Figure 3:
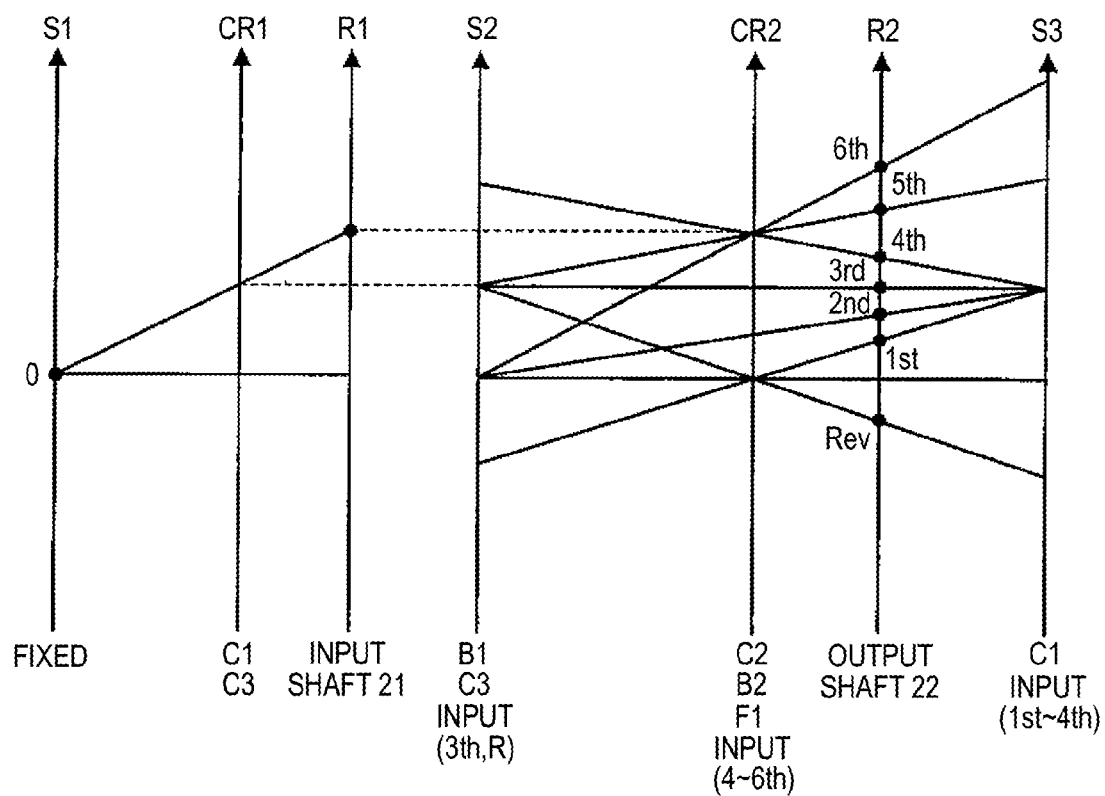
FIG. 3 is an illustration illustrating a rotation speed relationship between rotational elements at speeds of the speed change mechanism 30.

The speed change mechanism 30, as shown in FIG. 2, is arranged in such a way as to be able to perform a switching between forward first to sixth speeds, reverse, and neutral by combining a turning on and turning off (an engagement and disengagement) of the clutches C1 to C3 and a turning on and turning off of the brakes B1 and B2. A reverse condition can be formed by turning on the clutch C3 and brake B2, as well as turning off the clutches C1 and C2 and brake B1. Also, a forward first speed condition can be formed by turning on the clutch C1, as well as turning off the clutches C2 and C3 and brakes B1 and B2. In the forward first speed condition, the brake B2 is turned on when engine braking. A forward second speed condition can be formed by turning on the clutch C1 and brake B1, as well as turning off the clutches C2 and C3 and brake B2. A forward third speed condition can be formed by turning on the clutches C1 and C3, as well as turning off the clutch C2 and brakes B1 and B2. A forward fourth speed condition can be formed by turning on the clutches C1 and C2, as well as turning off the clutch C3 and brakes B1 and B2. A forward fifth speed condition can be formed by turning on the clutches C2 and C3, as well as turning off the clutch C1 and brakes B1 and B2. A forward sixth speed condition can be formed by turning on the clutch C2 and brake B1, as well as turning off the clutches C1 and C3 and brake B2. Also, a neutral condition can be formed by turning off all of the clutches C1 to C3 and brakes B1 and B2. FIG. 3 shows an illustration illustrating a relationship in rotation speed between rotational elements at the speeds of the speed change mechanism 30. An S1 axis in the drawing indicates the rotation speed of the sun gear 33, a CR1 axis indicates the rotation speed of the carrier 34, an R1 axis indicates the rotation speed of the ring gear 32, an S2 axis indicates the rotation speed of the sun gear 36b, an S3 axis indicates the rotation speed of the sun gear 36a, a CR2 axis indicates the rotation speed of the carrier 39, and an R2 axis indicates the rotation speed of the ring gear 37.

Figure 4:
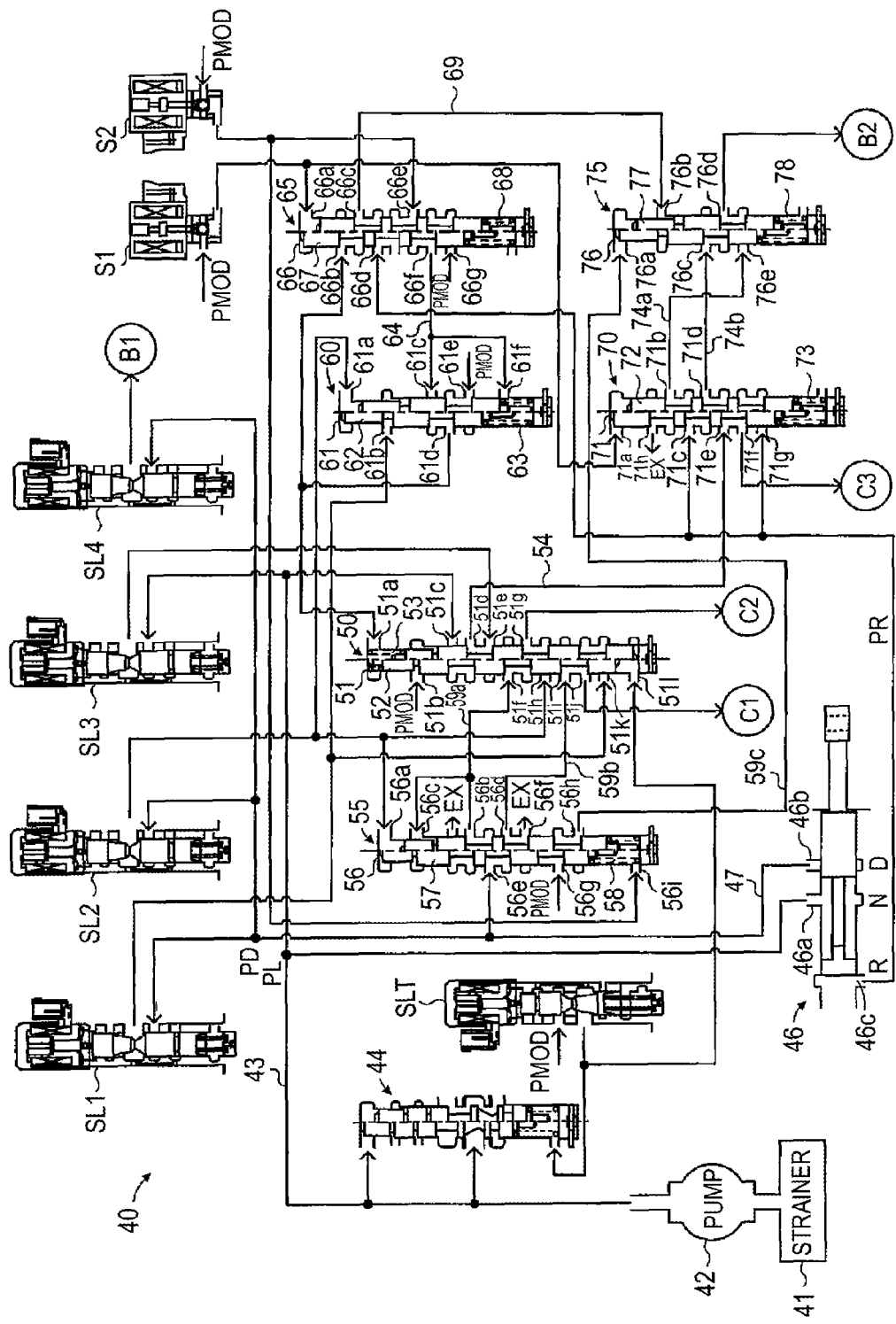
FIG. 4 is a configuration diagram showing an outline of a hydraulic circuit 40.

The turning on and off (engagement and disengagement) of the clutches C1 to C3, and the turning on and off of the brakes B1 and B2, in the speed change mechanism 30 are carried out by the hydraulic circuit 40 shown in FIG. 4. The hydraulic circuit 40, as shown in FIG. 4, is configured of a mechanical oil pump 42 which operates with the power from the engine 12, suctions hydraulic oil via a strainer 41, and pumps it to a line pressure oil passage 43, a primary regulator valve 44 which adjusts a pressure of the hydraulic oil pumped from the mechanical oil pump 42 and generates a line pressure PL, a linear solenoid valve SLT which adjusts a modulator pressure PMOD generated from the line pressure PL via an unshown modulator valve, and outputs it as a signal pressure, thereby driving the primary regulator valve 44, a manual valve 46, having formed therein an input port 46*a*, connected to the line pressure oil passage 43, through which the line pressure PL is input, a D (drive) position output port 46*b* connected to a drive pressure oil passage 47, an R (reverse) position output port 46*c*, and the like, which, as well as causing the input port 46*a* and D position output port 46*b* to communicate, blocks off the communication between the input port 46*a* and R position output port 46*c* when the shift lever 81 is operated to a D position, which, as well as blocking off the communication between the input port 46*a* and D position output port 46*b*, causes the input port 46*a* and R position output port 46*c* to communicate when the shift lever 81 is operated to an R position, and which blocks off the communication between the input port 46*a* and the D position output port 46*b* and R position output port 46*c* when the shift lever 81 is operated to an N position, a linear solenoid valve SL1 which inputs, adjusts, and outputs a drive pressure PD which is a pressure output from the D position output port 46*b*, a linear solenoid valve SL2 which inputs, adjusts, and outputs the drive pressure PD, a linear solenoid valve SL3 which inputs, adjusts, and outputs the line pressure PL from the line pressure oil passage 43, a linear solenoid valve SL4 which inputs and adjusts the drive pressure PD, and outputs it to the brake B1, a first clutch application relay valve 50 for selectively switching between a normal mode in which an SL1 pressure which is the output pressure of the linear solenoid valve SL1 is supplied to the clutch C1, an SL2 pressure which is the output pressure of the linear solenoid valve SL2 is supplied to the clutch C2, and an SL3 pressure which is the output pressure of the linear solenoid valve SL3 is supplied to one of the clutch C3 and brake B2, and a fail-safe mode in which the drive pressure PD is supplied to one of the clutch C1 and clutch C2, and the line pressure PL is supplied to the clutch C3, a second clutch application relay valve 55 for switching, when the first clutch application relay valve 50 is in the fail-safe mode, between a forward third speed mode in which, as well as the drive pressure PD being supplied to the clutch C1, the line pressure PL is supplied to the clutch C3, and a forward fifth speed mode in which, as well as the drive pressure PD being supplied to the clutch C2, the line pressure PL is supplied to the clutch C3, a first solenoid relay valve 60 and second solenoid relay valve 65 for outputting the modulator pressure PMOD and switching between the modes (normal mode and fail-safe mode) of the first clutch application relay valve 50, a C3-B2 application control valve 70 for switching between a mode in which the SL3 pressure is supplied to the clutch C3, a mode in which the line pressure PL is supplied to the clutch C3, and a reverse pressure PR which is a pressure output from the R position output port 46*c* is supplied to the brake B2, a mode in which the reverse pressure PR is supplied to the clutch C3 and brake B2, and a mode in which the SL3 pressure is supplied to the brake B2, a B2 application control valve 75 for switching between a mode in which the SL3 pressure from the C3-B2 application control valve 70 is supplied to the brake B2, a mode in which the reverse pressure PR is supplied to the brake B2, and a mode in which the hydraulic pressure acting on the brake B2 is drained, a first on/off solenoid valve S1 for driving the second solenoid relay valve 65 and C3-B2 application control valve 70, a second on/off solenoid valve S2 which outputs a signal pressure (an S2 pressure) for switching the mode of the first clutch application relay valve 50, instead of the modulator pressure PMOD, via the first solenoid relay valve 60 and second solenoid relay valve 65, and the like. Herein, in the working example, an arrangement is such that only the linear solenoid valve SLT, among the solenoid valves SLT, SL1 to SL4, S1, and S2, is configured as a normally opened type solenoid valve, and the other solenoid valves SL1 to SL4, S1, and S2 are configured as normally closed type solenoid valves.

The first clutch application relay valve 50, as shown in FIG. 4, includes a sleeve 51 in which various ports are formed, a spool 52 which, by sliding inside the sleeve 51, carries out a connection/disconnection between the ports, and a spring 53 which presses an end face of the spool 52. A first signal pressure port 51*a* through which the modulator pressure PMOD and S2 pressure from the first solenoid relay valve 60 are input as signal pressures which press the spool end face in a direction the same as that of a biasing force of the spring 53, a second signal pressure port 51*b* through which the modulator pressure PMOD is input as a signal pressure into a space sandwiched between different diameter lands of the spool 52, an input port 51*c* through which the line pressure PL is input, an output port 51*d* connected to a C3-B2 connecting oil passage 54 linked to the C3-B2 application control valve 70, an input port 51*e* through which the SL3 pressure of the linear solenoid valve SL3 is input, an input port 51*f* connected to a forward fifth speed connecting oil passage 59*a* linked to the second clutch application relay valve 55, an output port 51*g* connected to the clutch C2 (a hydraulic servo), an input port 51*h* through which the SL2 pressure of the linear solenoid valve SL2 is input, an output port 51*i* connected to a forward third speed connecting oil passage 59*b* linked to the second clutch application relay valve 55, an output port 51*j* connected to the clutch C1 (a hydraulic servo), an input port 51*k* through which the SL1 pressure of the linear solenoid valve SL1 is input, and a third signal pressure port 51*l* through which an SLT pressure which is the output pressure of the linear solenoid valve SLT is input as a signal pressure which presses the spool end face in a direction opposite to that of the biasing force of the spring 53, are formed in the sleeve 51 as the various ports.

With the first clutch application relay valve 50, the signal pressure input into the second signal pressure port 51*b* presses the spool 52 in a direction the same as that of the biasing force of the spring 53 by a differential pressure corresponding to a diameter difference (a pressurized area difference) between the lands, and the spool 52 moves in accordance with a relationship in balance between the biasing force of the spring 53 and a force which presses the spool 52 in a direction the same as that of the biasing force of the spring 53 with the signal pressure input into the first signal pressure port 51*a*, a force which presses the spool 52 in a direction the same as that of the biasing force of the spring 53 with the signal pressure input into the second signal pressure port 51*b*, and a force which presses the spool 52 in a direction opposite to that of the biasing force of the spring 53 with the signal pressure input into the third signal pressure port 51*l*. In the force balance relationship, as the modulator pressure PMOD is constantly input into the second signal pressure port 51*b*, and a signal pressure from the linear solenoid valve SLT for driving the primary regulator valve 44 is constantly input into the third signal pressure port 51*l*, when the modulator pressure PMOD or S2 pressure is not input into the first signal pressure port 51*a*, the pressing force from the third signal pressure port 51*l* overcomes a combined force of the biasing force of the spring 53 and the pressing force from the second signal pressure port 51*b*, causing the spool 52 to move in a direction in which the spring 53 contracts (to a position shown in the left half when FIG. 4 is viewed sideways). At this time, the linear solenoid valve SL3 side input port 51*e* and C3-B2 connecting oil passage 54 side output port 51*d* are caused to communicate, the linear solenoid valve SL2 side input port 51h and clutch C2 side output port 51g are caused to communicate, the linear solenoid valve SL1 side input port 51k and clutch C1 side output port 51j are caused to communicate, the communication between the forward fifth speed connecting oil passage 59a side input port 51f and clutch C2 side output port 51g is blocked off, and the communication between the forward third speed connecting oil passage 59b side input port 51i and clutch C1 side output port 51j is blocked off. Meanwhile, when the modulator pressure PMOD or S2 pressure is input into the first signal pressure port 51a, a combined force of the biasing force of the spring 53, the pressing force from the first signal pressure port 51a, and the pressing force from the second signal pressure port 51b overcomes the pressing force from the third signal pressure port 51l, causing the spool 52 to move in a direction in which the spring 53 expands (to a position shown in the right half when FIG. 4 is viewed sideways). At this time, the communication between the linear solenoid valve SL3 side input port 51e and C3-B2 connecting oil passage 54 side output port 51d is blocked off, the communication between the linear solenoid valve SL2 side input port 51h and clutch C2 side output port 51g is blocked off, the communication between the linear solenoid valve SL1 side input port 51k and clutch C1 side output port 51j is blocked off, the forward fifth speed connecting oil passage 59a side input port 51f and clutch C2 side output port 51g are caused to communicate, and the forward third speed connecting oil passage 59b side input port 51i and clutch C1 side output port 51j are caused to communicate.

The second clutch application relay valve 55, as shown in FIG. 4, includes a sleeve 56 in which various ports are formed, a spool 57 which, by sliding inside the sleeve 56, carries out a connecting/disconnection between the ports, and a spring 58 which presses an end face of the spool 57. A first signal pressure port 56a through which the SL2 pressure of the solenoid valve SL2 is input as a signal pressure which presses the spool end face of the spool 57 in a direction opposite to that of the biasing force of the spring 58, an output port 56b connected to the forward fifth speed connecting oil passage 59a, a second signal pressure port 56c, connected to the forward fifth speed connecting oil passage 59a, through which the hydraulic pressure in the oil passage is input as a signal pressure into a space sandwiched between different diameter lands of the spool 57, an output port 56d connected to the forward third speed connecting oil passage 59b, an input port 56e connected to the drive pressure oil passage 47, a drain port 56f, an input port 56g through which the modulator pressure PMOD is input, an output port 56h connected to a connecting oil passage 59c linked to the B2 application control valve 75, and a third signal pressure port 56i through which the S2 pressure of the second on/off solenoid valve S2 is input as a signal pressure which presses the end face of the spool 57 in a direction the same as that of the biasing force of the spring 58, are formed in the sleeve 56 as the various ports.

With the second clutch application relay valve 55, the signal pressure input into the second signal pressure port 56c presses the spool 57 in a direction opposite to that of the biasing force of the spring 58 by a differential pressure corresponding to a diameter difference (a pressurized area difference) between the lands, and the spool 57 moves in accordance with a relationship in balance between the biasing force of the spring 58 and a force which presses the spool 57 in a direction opposite to that of the biasing force of the spring 58 with the signal pressure input into the first signal pressure port 56a, a force which presses the spool 57 in a direction opposite to that of the biasing force of the spring 58 with the signal pressure input into the second signal pressure port 56c, and a force which presses the spool 57 in a direction the same as that of the biasing force of the spring 58 with the signal pressure input into the third signal pressure port 56i. When the SL2 pressure of the linear solenoid valve SL2 is not input into the first signal pressure port 56a, the spool 57 is moved by the biasing force of the spring 58 in a direction in which the spring 58 expands (to a position shown in the left half when FIG. 4 is viewed sideways). At this time, the drive pressure PD side input port 56e and forward third speed connecting oil passage 59b side output port 56d are caused to communicate, and the communication between the drive pressure PD side input port 56e and forward fifth speed connecting oil passage 59a is blocked off. Meanwhile, when the SL2 pressure of the linear solenoid valve SL2 is input into the first signal pressure port 56a, the pressing force from the first signal pressure port 56a overcomes the biasing force of the spring 58, causing the spool 57 to move in a direction in which the spring 58 contracts (to a position shown in the right half when FIG. 4 is viewed sideways). At this time, the communication between the drive pressure PD side input port 56e and forward third speed connecting oil passage 59b side output port 56d is blocked off, and the drive pressure PD side input port 56e and forward fifth speed connecting oil passage 59a are caused to communicate. Once the SL2 pressure of the linear solenoid valve SL2 is input into the first signal pressure port 56a, the drive pressure PD introduced into the forward fifth speed connecting oil passage 59a via the input port 56e and output port 56b is input into the second signal pressure port 56c, and the spool 57 is pressed by the drive pressure PD in a direction opposite to that of the biasing force of the spring 58, meaning that, even though the SL2 pressure is released after that, the position of the spool 57 is maintained as it is.

The first solenoid relay valve 60, as shown in FIG. 4, includes a sleeve 61 in which various ports are formed, a spool 62 which, by sliding inside the sleeve 61, carries out a connecting/disconnection between the ports, and a spring 63 which presses an end face of the spool 62. A first signal pressure port 61a through which the SL2 pressure of the linear solenoid valve SL2 is input as a signal pressure which presses the end face of the spool 62 in a direction opposite to that of the biasing force of the spring 63, a second signal pressure port 61b through which the SL1 pressure of the solenoid valve SL1 is input as a signal pressure into a space sandwiched between different diameter lands of the spool 62, an input port 61c connected to a connecting oil passage 64 linked to the second solenoid relay valve 65, an output port 61d linked to the signal pressure port 51a of the first clutch application relay valve 50, an input port 61e through which the modulator pressure PMOD is input, and a third signal pressure port 61f through which the hydraulic pressure in the connecting oil passage 64 is input as a signal pressure which presses the end face of the spool 62 in a direction the same as that of the biasing force of the spring 63, are formed in the sleeve 61 as the various ports.

With the first solenoid relay valve 60, the signal pressure input into the second signal pressure port 61b presses the spool 62 in a direction opposite to that of the biasing force of the spring 63 with a differential pressure corresponding to a diameter difference (a pressurized area difference) between the lands of the spool 62, and the spool 62 moves in accordance with a relationship in balance between the biasing force of the spring 63 and a force which presses the spool 62 in a direction opposite to that of the biasing force of the spring 63 with the signal pressure input into the first signal pressure port 61a, a force which presses the spool 62 in a direction opposite to that of the biasing force of the spring 63 with the signal pressure input into the second signal pressure port 61b, and a force which presses the spool 62 in a direction the same as that of the biasing force of the spring 63 with the signal pressure input into the third signal pressure port 61f. When the SL1 pressure of the linear solenoid valve SL1 is not input into the first signal pressure port 61a, and the SL2 pressure of the linear solenoid valve SL2 is not input into the second signal pressure port 61b either, the spool 62 is moved by the biasing force of the spring 63 in a direction in which the spring 63 expands (to a position shown in the left half when FIG. 4 is viewed sideways). At this time, the communication between the modulator pressure PMOD side input port 61e and first clutch application relay valve 50 signal pressure port 51a side output port 61d is blocked off, and the connecting oil passage 64 side input port 61c and first clutch application relay valve 50 signal pressure port 51a side output port 61d are caused to communicate. Meanwhile, when the SL1 pressure of the linear solenoid valve SL1 is input into the first signal pressure port 61a, or the SL2 pressure of the linear solenoid valve SL2 is input into the second signal pressure port 61b, the pressing force of the SL1 pressure or the pressing force of the SL2 pressure overcomes the biasing force of the spring 63, causing the spool 62 to move in a direction in which the spring 63 contracts (to a position shown in the right half when FIG. 4 is viewed sideways). At this time, the modulator pressure PMOD side input port 61e and first clutch application relay valve 50 signal pressure port 51a side output port 61d are caused to communicate, and the communication between the connecting oil passage 64 side input port 61c and first clutch application relay valve 50 signal pressure port 51a side output port 61d is blocked off.

The second solenoid relay valve 65, as shown in FIG. 4, includes a sleeve 66 in which various ports are formed, a spool 67 which, by sliding inside the sleeve 66, carries out a connecting/disconnection between the ports, and a spring 68 which presses an end face of the spool 67. A signal pressure port 66a through which the S1 pressure of the first on/off solenoid valve S1 is input as a signal pressure which presses the end face of the spool 67 in a direction opposite to that of the biasing force of the spring 68, an input port 66b linked to the output port 61d of the first solenoid relay valve 60, an output port 66c connected to a connecting oil passage 69 linked to the B2 application control valve 75, an input port 66d through which the reverse pressure PR is input, an input port 66e through which the S2 pressure of the second on/off solenoid valve S2 is input, an output port 66f connected to the connecting oil passage 64 linked to the first solenoid relay valve 60, and an input port 66g through which the modulator pressure PMOD is input, are formed in the sleeve 66 as the various ports.

With the second solenoid relay valve 65, when the S1 pressure of the first on/off solenoid valve S1 is not input into the signal pressure port 66a, the spool 67 is moved by the biasing force of the spring 68 in a direction in which the spring 68 expands (to a position shown in the left half when FIG. 4 is viewed sideways). At this time, the first solenoid relay valve 60 output port 61d side input port 66b and connecting oil passage 69 side output port 66c are caused to communicate, the second on/off solenoid valve S2 side input port 66e and connecting oil passage 64 side output port 66f are caused to communicate, and the communication between the modulator pressure PMOD side input port 66g and the output port 66f is blocked off. Meanwhile, when the S1 pressure of the first on/off solenoid valve S1 is input into the signal pressure port 66a, the pressing force of the S1 pressure overcomes the biasing force of the spring 68, causing the spool 67 to move in a direction in which the spring 68 contracts (to a position shown in the right half when FIG. 4 is viewed sideways). At this time, the communication between the first solenoid relay valve 60 output port 61d side input port 66b and connecting oil passage 69 side output port 66c is blocked off, the communication between the second on/off solenoid valve S2 side input port 66e and connecting oil passage 64 side output port 66f is blocked off, and the modulator pressure PMOD side input port 66g and the output port 66f are caused to communicate.

The C3-B2 application control valve 70, as shown in FIG. 4, includes a sleeve 71 in which various ports are formed, a spool 72 which, by sliding inside the sleeve 71, carries out a connecting/disconnection between the ports, and a spring 73 which presses an end face of the spool 72. A signal pressure port 71a through which the S1 pressure of the first on/off solenoid valve S1 is input as a signal pressure which presses the end face of the spool 72 in a direction opposite to that of the biasing force of the spring 73, an output port 71b connected to a first connecting oil passage 74a linked to the B2 application control valve 75, an input port 71c through which the reverse pressure PR is input, an output port 71d connected to a second connecting oil passage 74b linked to the B2 application control valve 75, an input port 71e connected to the first clutch application relay valve 50 side C3-B2 connecting oil passage 54, an output port 71f connected to the clutch C3 (a hydraulic servo), an input port 71g through which the reverse pressure PR is input, and a drain port 71h, are formed in the sleeve 71 as the various ports.

With the C3-B2 application control valve 70, when the S1 pressure of the first on/off solenoid valve S1 is not input into the signal pressure port 71a, the spool 72 is moved by the biasing force of the spring 73 in a direction in which the spring 73 expands (to a position shown in the left half when FIG. 4 is viewed sideways). At this time, the output port 71b on the side of the first connecting oil passage 74a linked to the B2 application control valve 75 and the drain port 71h are caused to communicate, the communication between the reverse pressure PR side input port 71c and first connecting oil passage 74a side output port 71b is blocked off, the input port 71c and the B2 application control valve 75 second connecting oil passage 74b side output port 71d are caused to communicate, the communication between the input port 71e on the side of the C3-B2 connecting oil passage 54 linked to the first clutch application relay valve 50 and the second connecting oil passage 74b side output port 71d is blocked off, the input port 71e and clutch C3 side output port 71f are caused to communicate, and the communication between the reverse pressure PR side input port 71g and the output port 71f is blocked off. Meanwhile, when the S1 pressure of the first on/off solenoid valve S1 is input into the signal pressure port 71a, the pressing force of the S1 pressure overcomes the biasing force of the spring 73, causing the spool 72 to move in a direction in which the spring 73 contracts (to a position shown in the right half when FIG. 4 is viewed sideways). At this time, the communication between the B2 application control valve 75 first connecting oil passage 74a side output port 71b and the drain port 71h is blocked off, the reverse pressure PR side input port 71c and first connecting oil passage 74a side output port 71b are caused to communicate, the communication between the input port 71c and the B2 application control valve 75 second connecting oil passage 74b side output port 71d is blocked off, the input port 71e on the side of the C3-B2 connecting oil passage 54 linked to the first clutch application relay valve 50 and the second connecting oil passage 74b side output port 71d are caused to communicate, the communication between the input port 71e and the clutch C3 side output port 71*f* is blocked off, and the reverse pressure PR side input port 71*g* and the output port 71*f* are caused to communicate.

The B2 application control valve 75, as shown in FIG. 4, includes a sleeve 76 in which various ports are formed, a spool 77 which, by sliding inside the sleeve 76, carries out a connecting/disconnection between the ports, and a spring 78 which presses an end face of the spool 77. A first signal pressure port 76*a* through which the hydraulic pressure (modulator pressure PMOD) from the output port 56*h* of the second clutch application relay valve 55 is input as a signal pressure which presses the end face of the spool 77 in a direction opposite to that of the biasing force of the spring 78, a second signal pressure port 76*b* through which the pressure output from the output port 66*c* (connecting oil passage 69) of the second solenoid relay valve 65 is input into a space sandwiched between different diameter lands of the spool 77 as a signal pressure, an input port 76*c* connected to the second connecting oil passage 74*b* linked to the C3-B2 application control valve 70, an output port 76*d* connected to the brake B2 (a hydraulic servo), and an input port 76*e* connected to the first connecting oil passage 74*a* linked to the C3-B2 application control valve 70, are formed in the sleeve 76 as the various ports.

With the B2 application control valve 75, when no signal pressure is input into the first signal pressure port 76*a* and second signal pressure port 76*b*, the spool 77 is moved by the biasing force of the spring 78 in a direction in which the spring 78 expands (to a position shown in the left half when FIG. 4 is viewed sideways). At this time, the second connecting oil passage 74*b* side input port 76*c* and brake B2 side output port 76*d* are caused to communicate, and the communication between the first connecting oil passage 74*a* side input port 76*e* and the output port 76*d* is blocked off. Meanwhile, when a signal pressure is input into either the first signal pressure port 76*a* or second signal pressure port 76*b*, the pressing force of the signal pressure overcomes the biasing force of the spring 78, causing the spool 77 to move in a direction in which the spring 78 contracts (to a position shown in the right half when FIG. 4 is viewed sideways). At this time, the communication between the second connecting oil passage 74*b* side input port 76*c* and brake B2 side output port 76*d* is blocked off, and the first connecting oil passage 74*a* side input port 76*e* and the output port 76*d* are caused to communicate.

With the hydraulic circuit 40 configured in this way, the neutral can be formed by turning on the second on/off solenoid valve S2. Also, the forward first speed can be formed by turning on the linear solenoid valve SL1, and when engine braking, can be formed by further turning on the first on/off solenoid valve S1, as well as turning on the linear solenoid valve SL3. Also, the forward second speed can be formed by turning on the linear solenoid valves SL1 and SL4, the forward third speed can be formed by turning on the linear solenoid valves SL1 and SL3, the forward fourth speed can be formed by turning on the linear solenoid valves SL1 and SL2, the forward fifth speed can be formed by turning on the linear solenoid valves SL2 and SL3, and the forward sixth speed can be formed by turning on the linear solenoid valves SL2 and SL4.

Now, a consideration will be given of a case in which the shift lever 81 is operated and shifted to the D (drive) position. In this case, normally, the automobile is travelling at one speed among the forward first speed to sixth speed, meaning that, as shown in an engagement table of FIG. 2, the first solenoid relay valve 60 is driven by either the SL1 pressure from the linear solenoid valve SL1 or the SL2 pressure from the linear solenoid valve SL2, and the modulator pressure PMOD is input into the first signal pressure input port 51*a* of the first clutch application relay valve 50. For this reason, the first clutch application relay valve 50 comes into the normal mode, the linear solenoid valve SL1 (output port) is connected to the clutch C1 via the input port 51*k* and output port 51*j* of the first clutch application relay valve 50, the linear solenoid valve SL2 (output port) is connected to the clutch C2 via the input port 51*h* and output port 51*g*, and the linear solenoid valve SL3 is connected to the C3-B2 connecting oil passage 54 via the input port 51*e* and output port 51*d*. When the first on/off solenoid valve S1 is turned off, the input port 71*e* connected to the C3-B2 connecting oil passage 54, and the output port 71*f* connected to the clutch C3, of the C3-B2 application control valve 70, communicate, meaning that the linear solenoid valve SL3 is connected to the clutch C3 via the input port 51*e* and output port 51*d* of the first clutch application relay valve 50, the C3-B2 connecting oil passage 54, and the input port 71*e* and output port 71*f* of the C3-B2 application control valve 70. Consequently, the corresponding solenoid valve, among the solenoid valves SL1 to SL4, is driven, thereby forming one of the forward first speed to sixth speed, at which it is possible to travel. Also, when engine braking, by turning on the first on/off solenoid valve S1, the input port 71*e* and the second connecting oil passage 74*b* side output port 71*d* are caused to communicate, instead of the communication between the C3-B2 connecting oil passage 54 side input port 71*e* and clutch C3 side output port 71*f* of the C3-B2 application control valve 70. In this condition, as the second connecting oil passage 74*b* is connected to the brake B2 via the input port 76*c* and output port 76*d* of the B2 application control valve 75, the linear solenoid valve SL3 is connected to the brake B2, instead of the clutch C3. Consequently, it is possible to turn on the brake B2 by supplying the SL3 pressure to the brake B2 from the linear solenoid valve SL3.

Next, a consideration will be given of a case in which all of the solenoid valves SLT, SL1 to SL4, S1, and S2 are deenergized in a condition in which the shift lever 81 is operated and shifted to the D position. In this case, as the linear solenoid valves SL1 and SL2 do not output the SL1 pressure and SL2 pressure respectively, the communication between the input port 61*e* through which the modulator pressure PMOD is input, and the output port 61*d* connected to the first signal pressure port 51*a* of the first clutch application relay valve 50, of the first solenoid relay valve 60 is blocked off, and the modulator pressure PMOD is not input into the first signal pressure port 51*a*. For this reason, the first clutch application relay valve 50 comes into the fail-safe mode, the forward third speed connecting oil passage 59*b* is connected to the clutch C1 via the input port 51*i* and output port 51*j* of the first clutch application relay valve 50, the forward fifth speed connecting oil passage 59*a* is connected to the clutch C2 via the input port 51*f* and output port 51*g*, and the line pressure oil passage 43 is connected to the C3-B2 connecting oil passage 54 via the input port 51*c* and output port 51*d*. Also, as the first on/off solenoid valve S1 is turned off, the input port 71*e* connected to the C3-B2 connecting oil passage 54, and the output port 71*f* connected to the clutch C3, of the C3-B2 application control valve 70 are caused to communicate, meaning that the line pressure oil passage 43 is connected to the clutch C3 via the input port 51*c* and output port 51*d* of the first clutch application relay valve 50, the C3-B2 connecting oil passage 54, and the input port 71*e* and output port 71*f* of the C3-B2 application control valve 70. Meanwhile, with the second clutch application relay valve 55, the drive pressure PD is supplied to the forward third speed connecting oil passage 59*b* when the SL2 pressure from the linear solenoid valve SL2 is not input into the first signal pressure port 56a, and the drive pressure PD is output to the forward fifth speed connecting oil passage 59a when the SL2 pressure from the linear solenoid valve SL2 is input into the first signal pressure port 56a. Consequently, when in the fail-safe mode, when travelling at one speed among the forward first speed to third speed, as well as the drive pressure PD being supplied to the clutch C1 from the forward third speed connecting oil passage 59b, the line pressure PL is supplied to the clutch C3, forming the forward third speed, and when travelling at one speed among the forward fourth speed to sixth speed, as well as the drive pressure PD being supplied to the clutch C2 from the forward fifth speed connecting oil passage 59a, the line pressure PL is supplied to the clutch C3, forming the forward fifth speed. Herein, when the drive pressure PD is supplied to the forward fifth speed connecting oil passage 59a by the SL2 pressure, the drive pressure PD is input into the second signal pressure port 56c too, meaning that even though the SL2 pressure is released after that, the condition in which the drive pressure PD is supplied to the forward fifth speed connecting oil passage 59a is maintained. When the second on/off solenoid valve S2 is turned on in this condition, the S2 pressure is input into the third signal pressure port 56i, meaning that the spool 57 moves to the left half position when FIG. 4 is viewed sideways, and the drive pressure PD is supplied to the forward third speed oil passage 59b, instead of the forward fifth speed oil passage 59a.

Also, when the shift lever 81 is operated from D through N to D while all of the solenoid valves SLT, SL1 to SL4, S1, and S2 are deenergized, forming the forward fifth speed, the manual valve 46 blocks off the communication between the input port 46a and D position port 46b when in the N position, meaning that the drive pressure PD decreases temporarily. At this time, in the second clutch application relay valve 55, as no signal pressure is input into the second signal pressure port 56c, the spool 57 moves to the left half position when FIG. 4 is viewed sideways and, as well as the communication between the input port 56e connected to the drive pressure oil passage 47 and the output port 56b connected to the forward fifth speed connecting oil passage 59a and the second signal pressure port 56c being blocked off, the input port 56e is caused to communicate with the output port 56d to which the forward third speed connecting oil passage 59b is connected, instead of the output port 56b. Consequently, as the drive pressure PD is not input into the second signal pressure port 56c even though the drive pressure PD rises after that by the shift lever 81 being returned from the N position to the D position, the drive pressure PD is supplied to the forward third speed connecting oil passage 59b, forming the forward third speed. In this way, even though the forward fifth speed is formed when in the fail-safe mode, it is possible to switch it to the forward third speed by carrying out the D-N-D operation.

Figure 5:
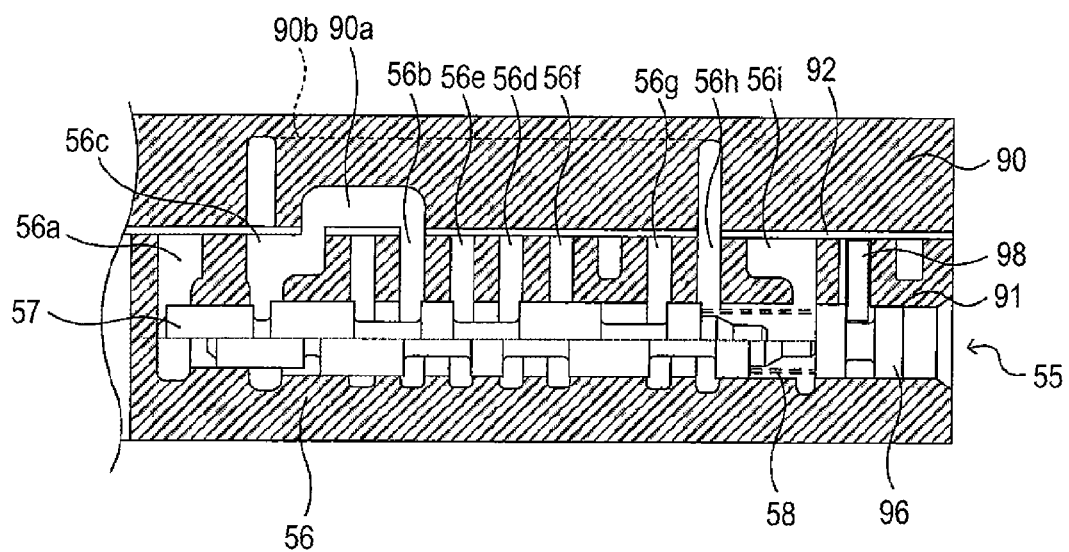
FIG. 5 is a sectional view showing how a second clutch application relay valve 55 is incorporated in valve bodies 90 and 91 using a separation plate 92.
Figure 6:
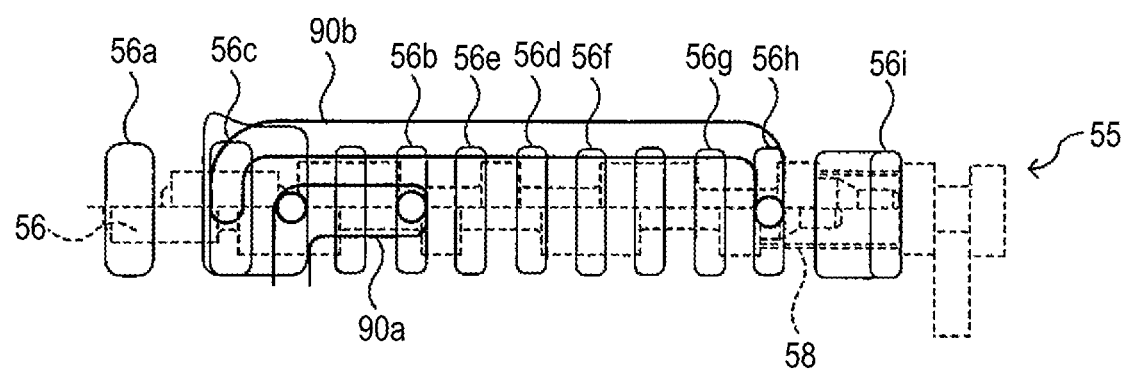
FIG. 6 is an illustration showing how ports of the second clutch application relay valve 55 are connected by the separation plate 92.
Figure 7:
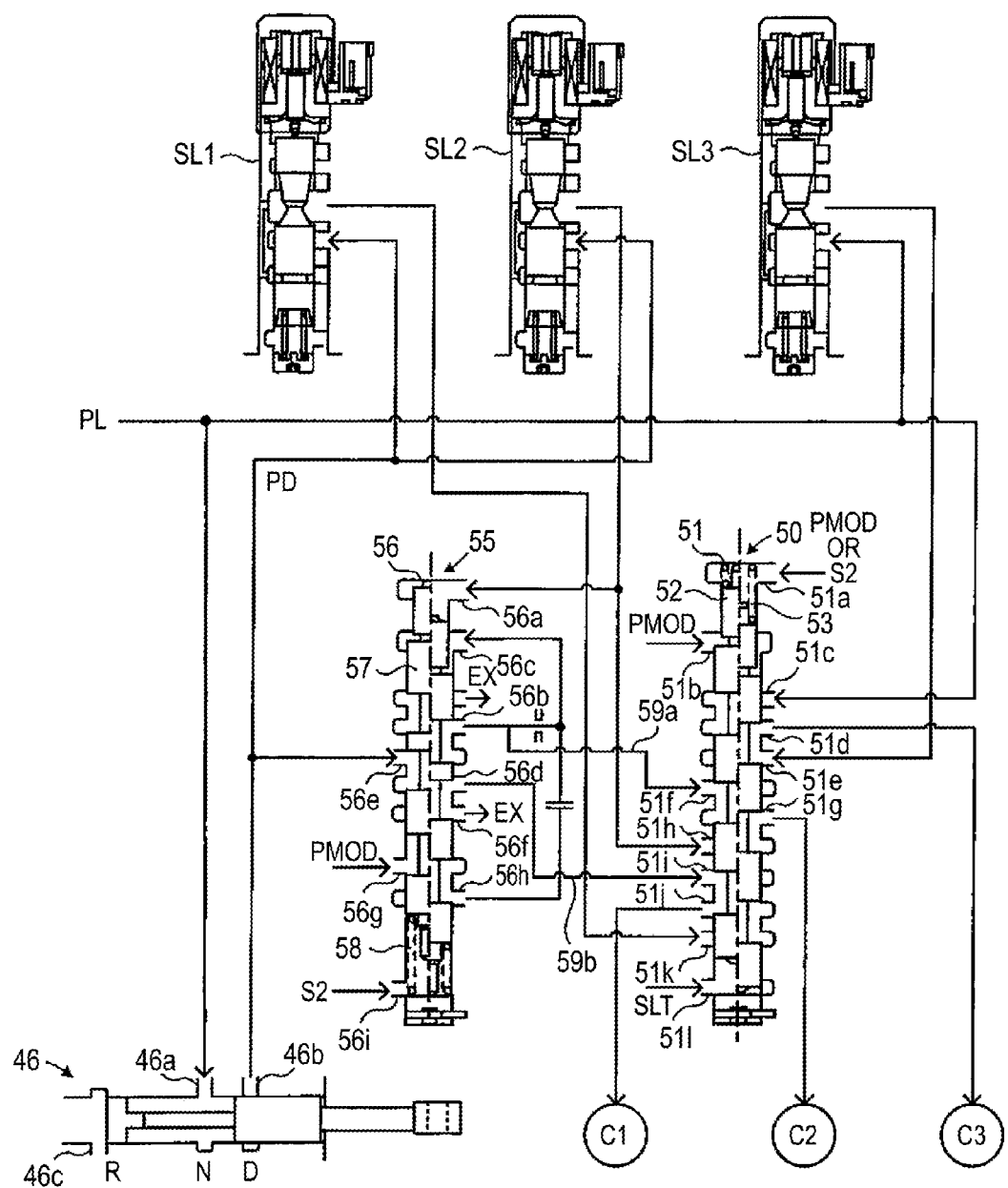
FIG. 7 is a partially enlarged view in which is enlarged one portion of the hydraulic circuit 40 when using the separation plate 92.

FIG. 5 is a sectional view showing how the second clutch application relay valve 55 is incorporated in valve bodies 90 and 91 using a separation plate 92, FIG. 6 is an illustration showing how the ports of the second clutch application relay valve 55 are connected by the separation plate 92, and FIG. 7 is a partially enlarged view in which is enlarged one portion of the hydraulic circuit 40 when using the separation plate 92. In the working example, an oil passage 90a connecting the output port 56b through which the drive pressure PD is output, and the second signal pressure port 56c, of the second clutch application relay valve 55, and an oil passage 90b connecting the output port 56h through which the modulator pressure PMOD is output and the second signal pressure port 56c, are formed in the valve body 90, while the ports 56a to 56i are formed in the valve body 91 with which the sleeve 56 of the second clutch application relay valve 55 is formed integrally, and an arrangement is such that, by interposing the plate-like separation plate 92 between the valve bodies 90 and 91, as well as the oil passage 90a being opened, the oil passage 90b is closed, and the drive pressure PD is input into the second signal pressure port 56c. In this case, as previously described, the switching from the forward fifth speed to the forward third speed is performed when the drive pressure PD lowers temporarily along with the D-N-D operation of the shift lever 81. The second clutch application relay valve 55 is fixed to the valve body 91 by inserting a plug 96 as a spring receiver after the spool 57 and spring 58 have been inserted thereinto in an axial direction, and fitting a key 98 in from a radial direction for use in retaining the plug 96.

Figure 8:
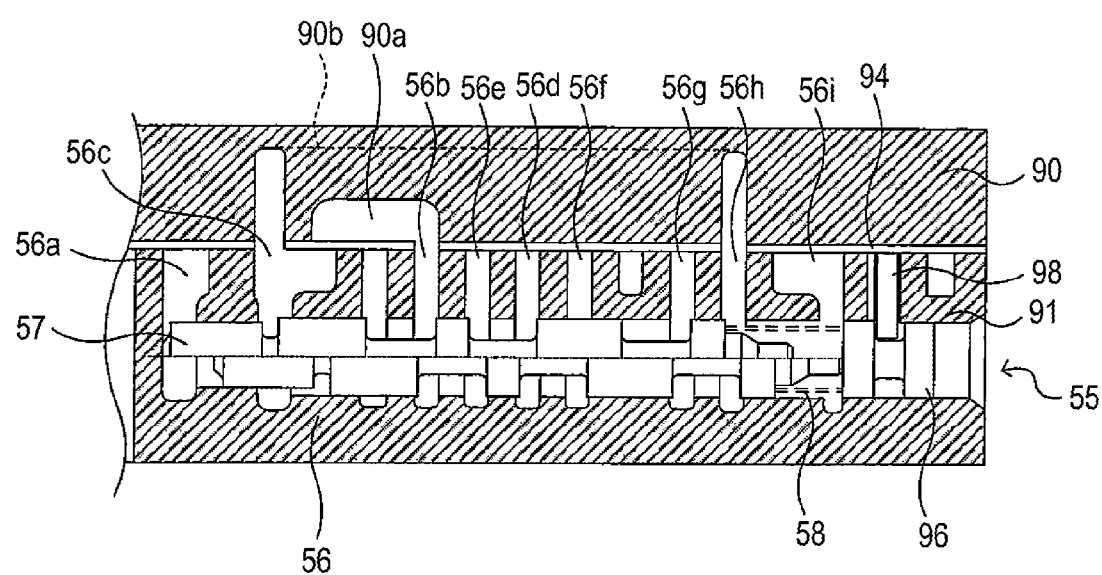
FIG. 8 is a sectional view showing how the second clutch application relay valve 55 is incorporated in the valve bodies 90 and 91 using a separation plate 94.
Figure 9:
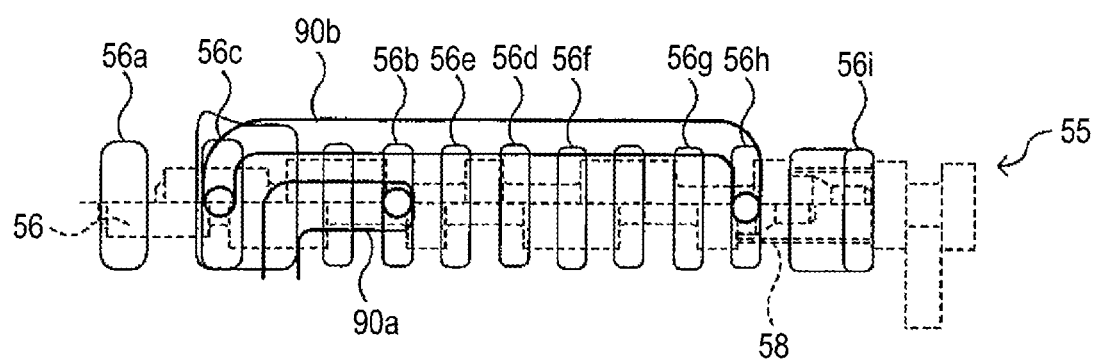
FIG. 9 is an illustration showing how the ports of the second clutch application relay valve 55 are connected by the separation plate 94.
Figure 10:
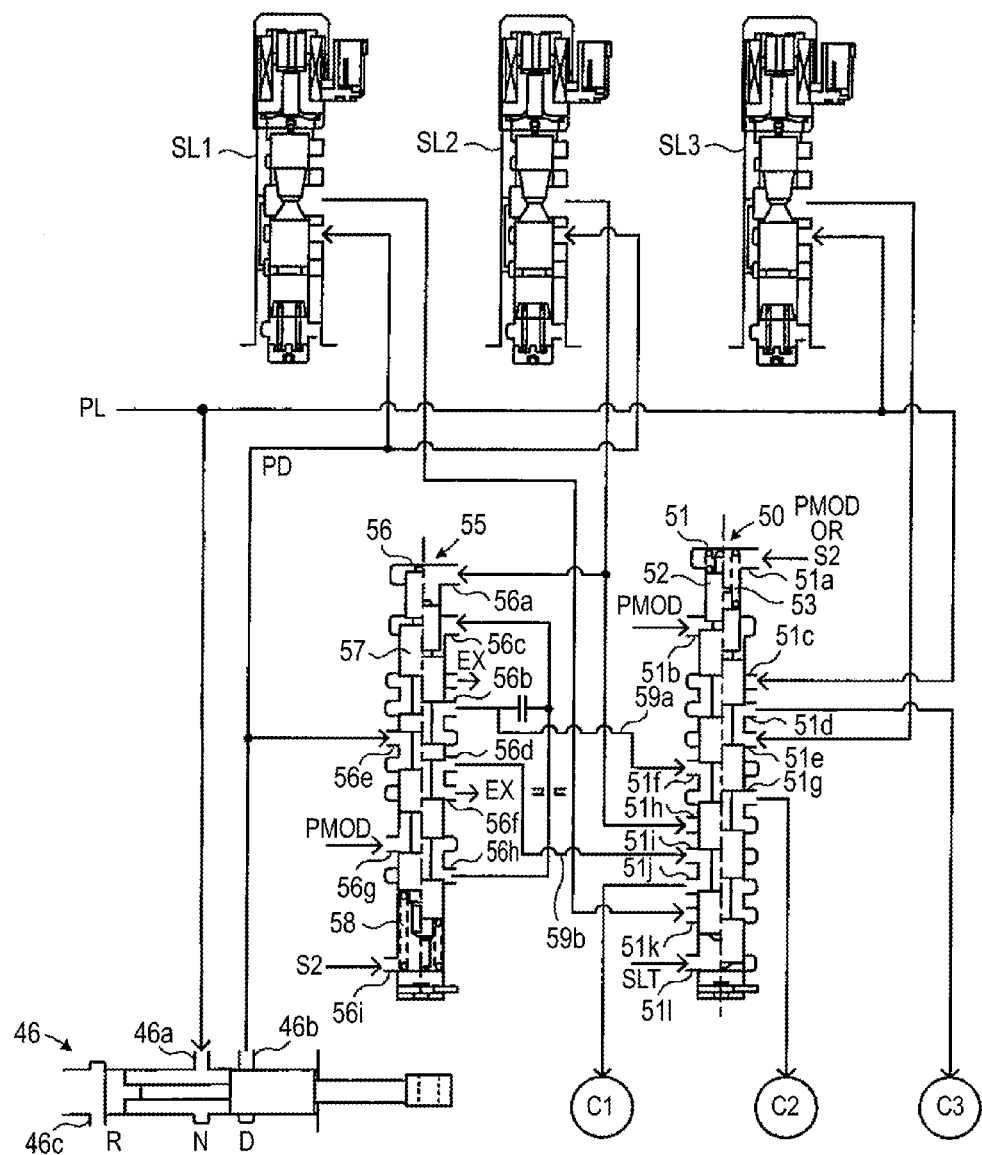
FIG. 10 is a partially enlarged view in which is enlarged one portion of the hydraulic circuit 40 when using the separation plate 94.

FIG. 8 is a sectional view showing how the second clutch application relay valve 55 is incorporated in the valve bodies 90 and 91 using a separation plate 94, FIG. 9 is an illustration showing how the ports of the second clutch application relay valve 55 are connected by the separation plate 94, and FIG. 10 is a partially enlarged view in which is enlarged one portion of the hydraulic circuit 40 when using the separation plate 94. In this example, an arrangement is such that, by using the separation plate 94 of which the shape is the same as that of, and the positions of holes brining the ports into communication with each other are different from those of, the separation plate 92, as well as the oil passage 90a connecting the output port 56b through which the drive pressure PD is output, and the second signal pressure port 56c, of the second clutch application relay valve 55 being closed, the oil passage 90b connecting the output port 56h through which the modulator pressure PMOD is output and the second signal pressure port 56c is opened, and the modulator pressure PMOD, instead of the drive pressure PD, is input into the second signal pressure port 56c. At this time, with the second clutch application relay valve 55, as the modulator pressure PMOD is input into the second signal pressure port 56c even when the shift lever 81 is in the N position, a condition is maintained in which the drive pressure PD is supplied to the forward fifth speed oil passage 59a. Consequently, the forward fifth speed is maintained even at the time of the D-N-D operation. Once the engine 12 is stopped such as, for example, by turning off the ignition, the mechanical oil pump 42 also stops, and the line pressure (modulator pressure PMOD) is released, meaning that no signal pressure is input into the second signal pressure port 56c, and the engine 12 is started after that, thereby causing the switching from the forward fifth speed to the forward third speed.

According to the hydraulic circuit device of the heretofore described working example, the oil passage 90a connecting the output port 56b through which the drive pressure PD is output, and the second signal pressure port 56c, of the second clutch application relay valve 55, and the oil passage 90b connecting the output port 56h through which the modulator pressure PMOD is output and the second signal pressure port 56c, are formed in the valve body 90, and the ports 56a to 56i are formed in the valve body 91 in which the second clutch application relay valve 55 is inserted, wherein an arrangement is such that, by interposing the separation plate 92 between the valve bodies 91 and 92, it is possible to open the oil passage 90a, as well as closing the oil passage 90b, and an arrangement is such that, by interposing the separation plate 94 between the valve bodies 90 and 91, it is possible to close the oil passage 90a, as well as opening the oil passage 90b, meaning that, simply by selecting the separation plate 92 or 94, it is possible to accommodate both the configuration of forming the forward third speed, and the configuration of forming the forward fifth speed, at the time of the D-N-D operation without involving a change of the valve bodies 90 and 91 and second clutch application relay valve 55.

In the working example, an arrangement is such that by the second clutch application relay valve 55, the forward third speed is fixed when a failure occurs while travelling at a low speed from the forward first speed to the forward third speed, and the forward fifth speed is fixed when a failure occurs while travelling at a high speed from the forward fourth speed to the forward fifth speed, but a speed to be fixed, not being limited to the forward third speed and forward fifth speed, may be a combination of any speeds.

In the working example, an arrangement is such that the speed change mechanism 30 with six speeds of the forward first speed to sixth speed is incorporated but, not being limited to this, an arrangement may be such that an automatic transmission with any number of speeds such as four speeds, five speeds, or eight speeds is incorporated. Also, the speed formed when all of the solenoid valves SLT, SL1, SL2, SL3, SL4, S1, and S2 are deenergized is not limited to the forward third speed or forward fifth speed either, and any speed is acceptable.

Heretofore, a description has been given, using the working example, of the embodiment of the invention but, the invention not being limited to such a working example in any way, it goes without saying that the invention can be carried out in various modes without departing from the scope thereof The invention is applicable to the automobile industry.

What is claimed is:

1. A hydraulic circuit device which supplies hydraulic pressure to a plurality of frictional engagement elements in an automatic transmission which, being mounted on a vehicle, can change a speed by switching a combination of an engagement and disengagement of the plurality of frictional engagement elements, comprising:
    a pump which generates the hydraulic pressure;
    a first pressure adjustment mechanism which generates a line pressure by adjusting the hydraulic pressure from the pump;
    a shift valve which inputs the line pressure and outputs it as a travel pressure when a shift operation to a travel position is done, and blocks off the output of the line pressure as the travel pressure when a shift operation to a non-travel position is done;
    a second pressure adjustment mechanism which inputs, adjusts, and outputs the line pressure or travel pressure;
    a first switching valve, connected to a first oil passage, a second oil passage, an oil passage on the second pressure adjustment mechanism side, and oil passages on the side of hydraulic servos of the plurality of frictional engagement elements, which switches between a first condition in which the second pressure adjustment mechanism side oil passage and hydraulic servo side oil passages are caused to communicate and, as well as the communication between the first oil passage and the oil passage on the side of the hydraulic servo of a frictional engagement element, among the plurality of frictional engagement elements, which forms a first speed, being blocked off, the communication between the second oil passage and the oil passage on the side of the hydraulic servo of a frictional engagement element, among the plurality of frictional engagement elements, which forms a second speed, is blocked off, and a second condition in which the communication between the second pressure adjustment mechanism side oil passage and hydraulic servo side oil passages is blocked off and, as well as the first oil passage and the oil passage on the side of the hydraulic servo of the frictional engagement element which forms the first speed being caused to communicate, the second oil passage and the oil passage on the side of the hydraulic servo of the frictional engagement element which forms the second speed are caused to communicate;
    a second switching valve, connected to the first oil passage, the second oil passage, and an oil passage on the shift valve side, which can switch between a first condition in which, as well as the shift valve side oil passage and the first oil passage being caused to communicate, the communication between the shift valve side oil passage and the second oil passage is blocked off, and a second condition in which, as well as the communication between the shift valve side oil passage and the first oil passage being blocked off, the shift valve side oil passage and the second oil passage are caused to communicate, which has a first condition maintaining port for inputting a signal pressure for maintaining the first condition, a first connecting port for inputting the travel pressure and outputting it to the first condition maintaining port, and a second connecting port for inputting the line pressure and outputting it to the first condition maintaining port, and which opens the first and second connecting ports when in the first condition, and closes the first and second connecting ports when in the second condition;
    a main body in which, as well as the oil passages being formed, a third oil passage connecting the first condition maintaining port and first connecting port of the second switching valve, and a fourth oil passage connecting the first condition maintaining port and second connecting port, are formed; and
    an oil passage closing member which selectively carries out a closing of the third oil passage and a closing of the fourth oil passage.

2. The hydraulic circuit device according to claim 1, wherein
    the oil passage closing member is a plate.

3. The hydraulic circuit device according to claim 1, wherein
    the main body has a first member in which the second switching valve is inserted, and the first condition maintaining port, first connecting port, and second connecting port are formed, and a second member in which the third oil passage and fourth oil passage are formed, and
    the oil passage closing member is interposed between the first member and second member.

4. The hydraulic circuit device according to claim 1, wherein
    when an acceleration side speed, among formable speeds, is formed, the second switching valve inputs the pressure output from the second pressure adjustment mechanism as a signal pressure and forms the first condition.

* * * * *